(12) United States Patent
Yu et al.

(10) Patent No.: US 11,383,735 B2
(45) Date of Patent: Jul. 12, 2022

(54) SYSTEM AND METHOD FOR DISPENSING A WARNING DEVICE FROM AN AUTONOMOUS VEHICLE

(71) Applicant: BEIJING BAIDU NETCOM SCIENCE AND TECHNOLOGY CO., LTD., Beijing (CN)

(72) Inventors: Ning Yu, Beijing (CN); Fan Zhu, Beijing (CN); Jingjing Xue, Beijing (CN); Chengfa Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 100 days.

(21) Appl. No.: 16/915,552

(22) Filed: Jun. 29, 2020

(65) Prior Publication Data
US 2021/0078599 A1 Mar. 18, 2021

(30) Foreign Application Priority Data
Sep. 16, 2019 (CN) .......................... 201910872738.X (51) Int. Cl.
*B60W 60/00* (2020.01)
*B60W 50/14* (2020.01)
(Continued)

(52) U.S. Cl.
CPC ........ *B60W 60/0017* (2020.02); *B60W 50/14* (2013.01); *B60W 60/0018* (2020.02);
(Continued)

(58) Field of Classification Search
None
See application file for complete search history.

(56) References Cited

U.S. PATENT DOCUMENTS

| 2015/0012166 A1* | 1/2015 | Hauler | B60W 30/0956 701/23 |
| 2015/0367860 A1* | 12/2015 | Koehler | B60W 50/0097 701/1 |

(Continued)

FOREIGN PATENT DOCUMENTS

| CN | 109298719 A | 2/2019 |
| CN | 109367544 A | 2/2019 |

(Continued)

OTHER PUBLICATIONS

DE 102016014025 A1 (Zaglauer et al.) translation obtained from Google Patents (Year: 2017).*

(Continued)

*Primary Examiner* — James J Lee
*Assistant Examiner* — Sophia Antonia Skipper
(74) *Attorney, Agent, or Firm* — Fay Sharpe LLP (57) ABSTRACT

Embodiments of the present disclosure disclose a vehicle fault processing method, a device and a medium, and relate to the field of autonomous driving technologies. The vehicle fault processing method includes: obtaining operating index data of a target vehicle and driving environment information of the target vehicle, the operating index data being configured to determine an operating condition of the target vehicle; determining whether a fault occurs in the target vehicle based on the operating index data; and when a fault occurs in the target vehicle, controlling the target vehicle to place a warning sign at a preset position based on the driving environment information.

16 Claims, 5 Drawing Sheets

(51) Int. Cl.
   *G08G 1/048* (2006.01)
   *G06V 20/58* (2022.01)
(52) U.S. Cl.
   CPC .... *B60W 60/0057* (2020.02); *B60W 60/0059* (2020.02); *G06V 20/58* (2022.01); *G08G 1/048* (2013.01); *B60W 2050/143* (2013.01); *B60W 2554/4041* (2020.02)

(56) References Cited

U.S. PATENT DOCUMENTS

| | | | |
|---|---|---|---|
| 2017/0297567 A1* | 10/2017 | Matsumura | B60W 40/08 |
| 2017/0297569 A1 | 10/2017 | Nilsson et al. | |
| 2017/0341575 A1* | 11/2017 | Hauler | B60Q 7/005 |
| 2019/0202351 A1 | 7/2019 | Wang | |
| 2019/0220026 A1* | 7/2019 | Vawter | B60Q 1/50 |

FOREIGN PATENT DOCUMENTS

| | | | | |
|---|---|---|---|---|
| CN | 109455136 A | | 3/2019 | |
| CN | 109606385 A | | 4/2019 | |
| CN | 109615854 A | | 4/2019 | |
| DE | 102012008090 A1 | * | 10/2013 | B60K 28/063 |
| DE | 102015220613 A1 | | 4/2017 | |
| DE | 102016006324 A1 | | 7/2017 | |
| DE | 102016014025 A1 | | 8/2017 | |
| DE | 102016221085 A1 | | 4/2018 | |
| ES | 1234249 U | | 9/2019 | |
| JP | 2011111071 A | | 6/2011 | |
| JP | 2016016708 A | | 2/2016 | |
| JP | 2019521901 A | | 8/2019 | |
| WO | 2014044480 A2 | | 3/2014 | |

OTHER PUBLICATIONS

DE 102012008090 A1 (Bartels et al.) translation obtained from Google Patents (Year: 2013).*
DE 102015220613 A1 (Hilsebecher et al.) translation obtained from EPO/ESPACE Patent Translate (Year: 2017).*
CN 109615854 A (Shan et al.) translation obtained from EPO/ESPACE (Year: 2019).*
Office Action for Chinese Application No. 201910872738.X, dated Jul. 27, 2020, 19 pages.
Extended European Search Report for EP Application No. 20166596.5, dated Feb. 9, 2021, 8 pages.
Office Action for Japanese Application No. 2020-117657, dated Sep. 7, 2021, 7 pages.
Japan Automobile Federation (JAF), "What Should I Do If An Accident or Breakdown Occurs on the Highway", 2021, 6 pages.

* cited by examiner

SYSTEM AND METHOD FOR DISPENSING A WARNING DEVICE FROM AN AUTONOMOUS VEHICLE

CROSS-REFERENCE TO RELATED APPLICATIONS

This application claims priority to and benefits of Chinese Patent Application No. 201910872738.X, filed with the State Intellectual Property Office of P. R. China on Sep. 16, 2019, which is incorporated herein by reference.

FIELD

Embodiments of the present disclosure relate to a field of computer technologies, more particularly, to a field of autonomous driving technologies, and specifically, to a vehicle fault processing method, a device and a medium.

BACKGROUND

At present, when an autonomous vehicle is driving on a road, a security guard is necessary to perform safety intervention. However, in a scene of commercial mass production and large-scale use of autonomous vehicles, for example, the use of a large number of non-human autonomous vehicles including autonomous logistics vehicles and autonomous high-speed heavy trucks, dependence on the security guard will be weaned off gradually, or even if a security guard is necessary, it is desired that the security guard interferes with the vehicle as little as possible.

Essentially, the autonomous vehicle is a machine, which would fail due to various problems. Under normal circumstances, after a vehicle breaks down, a driver needs to park the vehicle on a temporary strip, place a warning sign at a specified distance behind the vehicle, and turn on a warning light on the vehicle. However, when an autonomous vehicle fails during driving, how to deal with a vehicle fault independently of a security guard or the intervention of the security guard is still an urgent problem in the field of autonomous driving technologies.

SUMMARY

Embodiments of the present disclosure disclose a vehicle fault processing method, a device and a medium.

In a first aspect, an embodiment of the present disclosure discloses a vehicle fault processing method, including: obtaining operating index data of a target vehicle and driving environment information of the target vehicle, in which the operating index data is configured to determine an operating condition of the target vehicle; determining whether a fault occurs in the target vehicle based on the operating index data; and when the fault occurs in the target vehicle, controlling the target vehicle to place a warning sign at a preset position based on the driving environment information.

The above embodiment of the present disclosure has advantages or beneficial effects as follows. When an autonomous vehicle fails, the autonomous vehicle is controlled, based on the driving environment information, to automatically place the warning sign at a reasonable preset position adapt to the current driving environment information, so that an effect of autonomously executing an early fault warning by the autonomous vehicle without human intervention is achieved to prompt other vehicles on the road to pay attention to the autonomous vehicle, thereby avoiding vehicle collision accidents and improving road safety.

Alternatively, before controlling the target vehicle to place the warning sign at the preset position based on the driving environment information, the method further includes: determining a fault type of the target vehicle based on fault information of the target vehicle; and when the fault type supports the target vehicle in continuing to move, controlling the target vehicle to continue to move a preset parking distance before the target vehicle stops, in which a starting point of the preset parking distance is configured as a placement position of the warning sign.

The above embodiment of the present disclosure has advantages or beneficial effects as follows. By performing an analysis on the fault type, a degree of influence of the current fault on a driving state of the vehicle can be evaluated, so as to assist in determining whether the target vehicle is supported in continuing to move and evaluate a movable distance.

Alternatively, before controlling the target vehicle to continue to move a preset parking distance before the target vehicle stops, the method further includes: obtaining a minimum braking distance of an evasive vehicle behind the target vehicle, an emergency response distance of a driver on the evasive vehicle, and a line-of-sight range of the driver; and determining the preset parking distance based on the minimum braking distance, the emergency response distance and the line-of-sight range.

The above embodiment of the present disclosure has advantages or beneficial effects as follows. The preset parking distance of the target vehicle is determined based on the minimum braking distance of the evasive vehicle behind the target vehicle, the emergency response distance of the driver on the evasive vehicle, and the line-of-sight range of the driver, and thus an effect of reasonably setting a safety distance between a faulty vehicle and the warning sign based on specific road conditions and weather conditions is achieved. The reasonableness of the setting of the safety distance ensures road safety and lowers a probability of collision accidents on the road.

Alternatively, controlling the target vehicle to place the warning sign at the preset position based on the driving environment information includes: determining a type of road on which the target vehicle is driving based on the driving environment information; and controlling, based on the type of road, the target vehicle to place the warning sign at the preset position corresponding to the type of road.

The above embodiment of the present disclosure has advantages or beneficial effects as follows. By placing the warning signs at preset positions corresponding to the types of roads according to different types of roads, an effect of placing warning signs differently according to actual situations of the roads is achieved, thereby lowering a probability of accidents on different types of roads.

Alternatively, controlling the target vehicle to place the warning sign at the preset position based on the driving environment information includes: determining, based on a vehicle position in the driving environment information, whether a curve entrance exists on a vehicle driving path on which the target vehicle drives a first preset distance based on the vehicle position; and when the curve entrance exists, controlling the target vehicle to place the warning sign at a position having a second preset distance from the curve entrance before the target vehicle enters the curve entrance.

The above embodiment of the present disclosure has advantages or beneficial effects as follows. By judging in advance whether there is a curve entrance on the vehicle driving path, the target vehicle may enter an execution state of placing the warning sign in advance when a fault occurs in the target vehicle, and place the warning sign at a position before the curve entrance. Consequently, a probability of the warning sign being timely discovered by other vehicles may be increased, and situations where the warning sign cannot be easily found due to obstacles, trees and mountains in the curve blocking road may be avoided, thereby reducing the occurrence of collision accidents and improving road safety.

Alternatively, controlling the target vehicle to place the warning sign at the position having the second preset distance from the curve entrance includes: obtaining a position of the curve entrance from a navigation map; calculating a distance between a parallel line where a tail of the target vehicle is located and the position of the curve entrance in real time during driving of the target vehicle, in which the parallel line where the tail of the target vehicle is located is perpendicular to a driving direction of the target vehicle; and when the distance calculated in real time reaches the second preset distance, controlling the target vehicle to place the warning sign on the parallel line where the tail of the target vehicle is located based on a current position of the target vehicle.

Alternatively, controlling the target vehicle to place the warning sign at the preset position based on the driving environment information includes: when it is determined based on the driving environment information that an obstacle exists on a road on which the target vehicle is driving, determining the preset position to place the warning sign based on a distribution of the obstacle and a simulation analysis result of a blind zone of an evasive vehicle behind the target vehicle; and controlling the target vehicle to place the warning sign at the preset position, so that the warning sign is located outside a boundary of the blind zone of the evasive vehicle.

The above embodiment of the present disclosure has advantages or beneficial effects as follows. Through analyzing the blind zone of the evasive vehicle behind the target vehicle, a phenomenon in which the placement of the warning sign is unreasonable due to an existence of the blind zone of the vehicle behind the target vehicle is reduced, so that in the line-of-sight range of human eyes, the driver on the evasive vehicle may find the warning sign in time and avoid the target vehicle timely. In addition, the target vehicle has a function of analyzing the blind zone of the evasive vehicle, so the target vehicle may adapt to different road scenes, and an effect of flexibly determining the positions to place the warning signs according to different road scenes is achieved.

Alternatively, determining the preset position to place the warning sign based on the distribution of the obstacle and the simulation analysis result of the blind zone of the evasive vehicle behind the target vehicle includes: adjusting a lateral position and/or a longitudinal position of the warning sign based on the distribution of the obstacle and the simulation analysis result of the blind zone of the evasive vehicle behind the target vehicle to determine the preset position to place the warning sign.

Alternatively, controlling the target vehicle to place the warning sign at the preset position based on the driving environment information includes: when it is determined based on the driving environment information that an obstacle exists on a road on which the target vehicle is driving, controlling, based on a distribution of the obstacle, the target vehicle to place the warning sign at the preset position corresponding to the distribution of the obstacle; in which the preset position corresponding to the distribution of the obstacle is a safe position to place the warning sign determined in advance by performing a road simulation on the distribution of the obstacle.

The above embodiment of the present disclosure has advantages or beneficial effects as follows. By predetermining the position to place the warning sign based on the road scene simulation, when the fault occurs in the target vehicle, a phenomenon in which the placement of the warning sign is unreasonable due to an existence of the blind zone of the vehicle behind the target vehicle is reduced while saving resource consumption of determining the position to place the warning sign, thereby improving an efficiency of placing the warning sign.

Alternatively, when the fault type supports the target vehicle in continuing to move, controlling the target vehicle to continue to move the preset parking distance before the target vehicle stops includes: when the fault type supports the target vehicle in continuing to move, switching the target vehicle from a normal driving mode to an abnormal state processing mode; and controlling the target vehicle to continue to move the preset parking distance based on a planned path in the abnormal state processing mode before the target vehicle stops.

The above embodiment of the present disclosure has advantages or beneficial effects as follows. Through the switching of the driving mode of the target vehicle and a path planning of an emergency stop, the target vehicle may continue to drive a set distance after a fault occurs. Therefore, it may be ensured that the warning sign is placed at a position having a certain distance from the target vehicle, thereby reducing a risk of collision between other vehicles and the target vehicle.

Alternatively, the method further includes: when the fault type does not support the target vehicle in continuing to move, sending a vehicle emergency signal while the target vehicle places the warning sign, so as to obtain rescue.

In a second aspect, an embodiment of the present disclosure further discloses a vehicle fault processing apparatus, including: a data obtaining module, configured to obtain operating index data of a target vehicle and driving environment information of the target vehicle, in which the operating index data is configured to determine an operating condition of the target vehicle; a vehicle fault determining module, configured to determine whether a fault occurs in the target vehicle based on the operating index data; and a warning sign placing module, configured to, when the fault occurs in the target vehicle, control the target vehicle to place a warning sign at a preset position based on the driving environment information.

In a third aspect, an embodiment of the present disclosure further discloses an electronic device, including: at least one processor; and a memory communicably connected to the at least one processor; wherein, the memory stores an instruction executable by the at least one processor, and when the instruction is executed by the at least one processor, the at least one processor may execute a vehicle fault processing method according to any one of the embodiments of the present disclosure.

In a fourth aspect, an embodiment of the present disclosure further discloses a non-transitory computer-readable storage medium having a computer instruction stored thereon. The computer instruction is configured to enable a computer to execute a vehicle fault processing method according to any one of the embodiments of the present disclosure.

According to technical solutions of the embodiments of the present disclosure, when an autonomous vehicle fails, a reasonable position to place the warning sign is determined based on the driving environment information, and the autonomous vehicle is controlled to place the warning sign automatically, thereby solving a problem in the prior art that there is no effective solution for the autonomous vehicle to automatically execute the early fault warning. Consequently, an effect of autonomously executing the early fault warning by the autonomous vehicle without human intervention is achieved to prompt other vehicles on the road to pay attention to the autonomous vehicle, thereby avoiding vehicle collision accidents and improving road safety. Other effects of the foregoing optional implementations will be described below with reference to specific embodiments.

BRIEF DESCRIPTION OF THE DRAWINGS

The accompanying drawings are used to better understand the solutions, and do not constitute a limitation on the present disclosure.

DETAILED DESCRIPTION

Exemplary embodiments of the present disclosure are described below with reference to the accompanying drawings, and include various details of the embodiments of the present disclosure to facilitate understanding. The various details should be considered as merely exemplary. Therefore, a person skilled in the art should recognize that various changes and modifications may be made to the embodiments described herein without departing from the scope and spirit of the present disclosure. Also, for clarity and conciseness, descriptions of well-known functions and structures are omitted in the following description.

Figure 1:
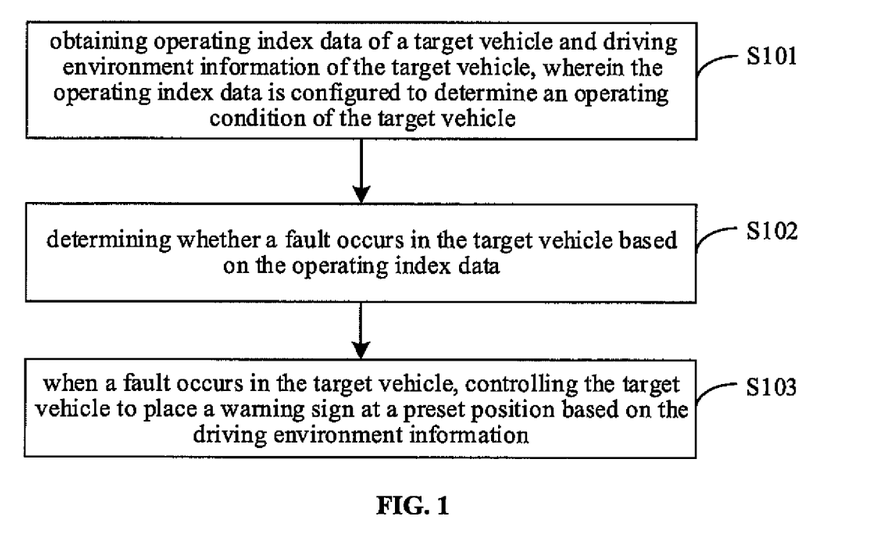
FIG. 1 is a flow chart of a vehicle fault processing method according to an embodiment of the present disclosure.

FIG. 1 is a flow chart of a vehicle fault processing method according to an embodiment of the present disclosure. The embodiment may be applicable to automatically placing a warning sign, for example, any type of warning sign, when a driving fault occurs in an autonomous vehicle, to achieve a purpose of prompting other driving vehicles to avoid the autonomous vehicle. The method according to the embodiment may be executed by a vehicle fault processing apparatus, which may be implemented in a software and/or hardware manner, and may be integrated in a vehicle control system or a vehicle-mounted device.

As shown in FIG. 1, the vehicle fault processing method according to the embodiment may include the following.

At block S101, operating index data of a target vehicle and driving environment information of the target vehicle are obtained. The operating index data is configured to determine an operating condition of the target vehicle.

During driving of the target vehicle, the operating index data of the target vehicle may be obtained in real time or periodically to determine whether there is a fault in the operating condition of the target vehicle. The operating index data may include, but is not limited to, vehicle state data, operating state data of hardware devices related to autonomous driving, operating state data of core modules of autonomous driving, and operating state data of a vehicle system. The vehicle state data may include: tire pressure, power usage, motor state, operating state of a gearbox, driving speed, etc.; the operating state data of hardware devices related to autonomous driving may include state detection data of devices such as an industrial personal computer, a camera, a radar, a light detection and ranging (Lidar), a global positioning system (GPS), an inertial measurement unit (IMU), and a global navigation satellite system (Novatel); the operating state data of core modules of autonomous driving may include: state detection data of service modules such as a perception module, a positioning module, a decision control module, and a map module; and the operating state data of the vehicle system may include state detection data of services such as an operating system, a driver, system resources and network communication. When determining whether a fault occurs in the target vehicle, one or more kinds of the above operating index data may be used for evaluation and determination.

The driving environment information is configured to describe a current driving environment of the target vehicle, which may include, but is not limited to: a type of road on which the target vehicle is driving, deployment of road facilities, lane information, traffic flow information around the target vehicle, surrounding environment information of the road, and a driving position of the target vehicle. The surrounding environment information of the road may include information such as whether there is an obstacle on the road surface or road sides, and whether there are trees or mountains blocking the road on both sides of the road. In detail, sensors deployed on the target vehicle may be configured to obtain the driving environment information.

At block S102, it is determined whether a fault occurs in the target vehicle based on the operating index data.

When it is determined that a fault occurs in the target vehicle as one or more kinds of the operating index data are substandard, block S103 is performed. The number of items of substandard operating index data is related to a fault judgment standard of the target vehicle, which is not limited in the embodiment. When it is determined that no fault occurs in the target vehicle according to the operating index data, the target vehicle may be controlled to continue to drive normally.

At block S103, when a fault occurs in the target vehicle, the target vehicle is controlled to place a warning sign at a preset position based on the driving environment information.

The preset position of the warning sign includes a lateral position and a longitudinal position where the warning sign is placed on the road. The lateral position refers to a placement position of the warning sign in a direction perpendicular to a driving direction of the vehicle, and the longitudinal position refers to a placement position of the warning sign in a direction parallel to the driving direction of the vehicle. The placement position of the warning sign may be characterized by a position of the center of the warning sign, or by a position of a boundary of the warning sign. On the premise of ensuring that the road safety warning may be noticed by other vehicles in time, the preset positions of the warning signs may be reasonably set according to different driving environment information. In detail, a reasonable placement position of the warning sign in a road scene may be determined based on pre-simulation of the road scene, or the placement position of the warning sign may be determined based on a real-time analysis of the driving environment information during the driving of the target vehicle. Predetermining the placement position of the warning sign based on simulation of the road scene may save resource consumption of decision-making computing on determining the placement position of the warning sign when the vehicle fails, thereby improving the efficiency of placing the warning sign. Determining the placement position of the warning sign based on the real-time analysis of the driving environment information may adapt to changing road scenes, and achieve an effect of flexibly determining the placement positions according to different road scenes.

When the autonomous vehicle fails, by automatically taking the warning sign out from the vehicle body or a cabin and placing the warning sign at a reasonable preset position according to the current driving environment information, an effect of autonomously executing an early fault warning without human intervention is achieved to prompt other vehicles on the road to pay attention to the autonomous vehicle, thereby avoiding vehicle collision accidents.

Alternatively, controlling the target vehicle to place the warning sign at the preset position based on the driving environment information includes: determining the type of road on which the target vehicle is driving based on the driving environment information; and controlling, based on the type of road, the target vehicle to place the warning sign at the preset position corresponding to the type of road.

Technologies such as image recognition or map matching may be used to determine the current type of road based on the driving environment information of the target vehicle. Exemplarily, the driving environment information includes a driving position of the target vehicle. According to the driving position, the road on which the target vehicle is driving may be determined through position matching on a map, and then the type of the road may be determined; or the type of the road on which the target vehicle is driving may be determined based on the driving position and shape recognition of the road. Since for various types of roads, safety warning regulations and driving characteristics of vehicles are different, determining placement positions of warning signs according to the types of roads may achieve an effect of placing warning signs differently according to actual situations of roads, and lower a probability of accidents on different types of roads.

Illustratively, regarding the longitudinal position of the warning sign, the warning sign may be placed behind the vehicle body at a position having a preset longitudinal distance from the parking position of the target vehicle. For example, when the type of road is a straight road and a ramp, the preset longitudinal distance may refer to a straight-line distance between the parking position of the target vehicle and the placement position of the warning sign; and when the type of road is a ramp, the preset longitudinal distance may refer to a curved distance between the parking position of the target vehicle and the placement position of the warning sign. A specific value of the preset longitudinal distance may be determined according to different road regulations, for example, the value may be set as 150 meters. Regarding the lateral position of the warning sign, the warning sign may be placed in a direction close to the centerline of the road. In detail, the lateral position may be adaptively set without affecting normal driving of other vehicles. In addition, for the ramp, when determining the placement position of the warning sign, factors such as views of vehicles going uphill blocking by the top of the ramp and acceleration of vehicles going downhill may be taken into consideration to adjust the placement position of the warning sign reasonably, so as to avoid accidents.

Alternatively, controlling the target vehicle to place the warning sign at the preset position based on the driving environment information includes: determining, based on a vehicle position in the driving environment information, whether a curve entrance exists on a vehicle driving path on which the target vehicle drives a first preset distance based on the vehicle position; and when the curve entrance exists, controlling the target vehicle to place the warning sign at a position having a second preset distance from the curve entrance before the target vehicle enters the curve entrance.

The first preset distance may be adaptively set according to factors such as driving speeds of the vehicle on different roads, and is not specifically limited in this embodiment. For example, when the vehicle speed is relatively fast, the first preset distance may be set to a small value. By predetermining whether there is a curve entrance on the vehicle driving path, the target vehicle may enter an execution state of placing the warning sign in advance when there is the presence of fault in the target vehicle, to place the warning sign on the segment of road before the curve entrance. Compared with placing the warning sign on the curve, placing the warning sign on the segment of road before the curve entrance may raise a probability of the warning sign being noticed by other vehicles in time, and situations where the warning sign cannot be easily found due to obstacles, trees and mountains in the curves blocking roads may be avoided, thereby reducing the occurrence of collision accidents and improving road safety. The second preset distance may be adaptively set based on considerations related to road safety. In addition, during driving of the target vehicle, it may be determined whether based on the distance between the target vehicle and the curve entrance the placement position of the warning sign meets a requirement of the second preset distance.

Exemplarily, controlling the target vehicle to place the warning sign at the position having the second preset distance from the curve entrance includes: obtaining a position of the curve entrance from a navigation map; calculating a distance between a parallel line where a tail of the target vehicle is located and the position of the curve entrance in real time during the driving of the target vehicle, in which the parallel line where the tail of the target vehicle is located is perpendicular to a driving direction of the target vehicle; and when the distance calculated in real time reaches the second preset distance, controlling the target vehicle to place the warning sign on the parallel line where the tail of the target vehicle is located based on a current position of the target vehicle.

In detail, when it is determined that there is a curve entrance on the driving path of the target vehicle, the position of the curve entrance may be determined by using position data in the navigation map, and then, in combination with real-time positioning coordinates and a body length of the target vehicle, a distance between the parallel line where the tail of the vehicle body is located and the position of the curve entrance may be calculated. When the distance calculated in real time reaches the second preset distance, the warning sign may be placed in a direction close to the centerline of the road along the parallel line where the tail of the vehicle body is located. The target vehicle may continue to move after the placement operation is completed.

According to the technical solutions of the embodiments of the present disclosure, when an autonomous vehicle fails, the autonomous vehicle is controlled, based on the driving environment information, to automatically place the warning sign at a reasonable preset position that is adapt to the current driving environment information, so that an effect of autonomously executing an early fault warning by the autonomous vehicle without human intervention is achieved to prompt other vehicles on the road to pay attention to the autonomous vehicle, thereby avoiding vehicle collision accidents and improving road safety. In addition, by placing warning signs at preset positions corresponding to the types of roads according to different types of roads, an effect of placing warning signs differently according to actual situations of the roads is achieved, thereby lowering a probability of accidents on different types of roads.

Figure 2:
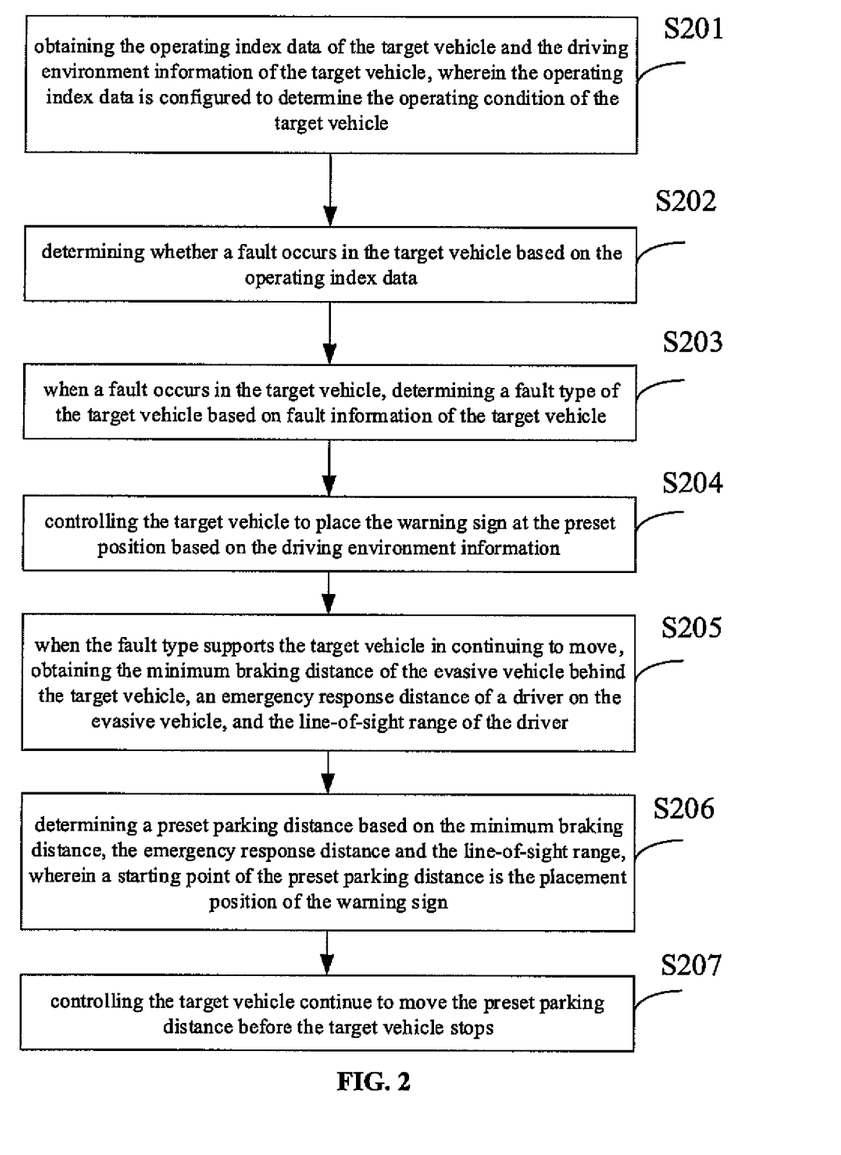
FIG. 2 is a flow chart of a vehicle fault processing method according to another embodiment of the present disclosure.

FIG. 2 is a flow chart of a vehicle fault processing method according to another embodiment of the present disclosure, which is optimized and expanded based on the foregoing embodiment, and may be combined with various alternative technical solutions in the foregoing embodiment. As shown in FIG. 2, the method may include the following.

At block S201, operating index data of a target vehicle and driving environment information of the target vehicle are obtained. The operating index data is configured to determine an operating condition of the target vehicle.

At block S202, it is determined whether a fault occurs in the target vehicle based on the operating index data.

At block S203, when a fault occurs in the target vehicle, a fault type of the target vehicle is determined based on fault information of the target vehicle.

In this embodiment, the fault type may be determined according to a degree of influence of the fault on the normal driving of the vehicle, and for each fault type, in combination with performance of the vehicle, a maximum distance that the vehicle may continue to move will be evaluated in advance. For example, the fault types may include a serious fault, a medium fault, and a minor fault, the impact of which on the normal driving of the vehicle gradually decreases, while the maximum distance that the vehicle may continue to move increases.

Therefore, by performing an analysis on the fault type, a degree of influence of the current fault on a driving state of the vehicle may be evaluated, so as to assist in determining whether the target vehicle is supported in continuing to move, and evaluate a movable distance of the target vehicle. In other words, the preset parking distance determined subsequently based on a minimum braking distance, an emergency response distance and a line-of-sight range should be within the movable distance evaluated based on the fault type. If the maximum distance that the target vehicle may continue to move after the fault is not long enough to reach the preset parking distance determined below, the target vehicle may be controlled to drive the maximum moving distance it supports before the target vehicle stops.

At block S204, the target vehicle is controlled to place the warning sign at a preset position based on the driving environment information.

It should be noted that there is no execution order limitation between blocks S203 and S204, that is, the determination of the fault type and the placement of the warning sign may be performed at the same time or at different times. The execution order illustrated in FIG. 2 should not be understood as a limitation of the embodiment.

At block S205, when the fault type supports the target vehicle in continuing to move, the minimum braking distance of an evasive vehicle behind the target vehicle, the emergency response distance of a driver on the evasive vehicle, and the line-of-sight range of the driver are obtained.

At block S206, a preset parking distance is determined based on the minimum braking distance, the emergency response distance and the line-of-sight range. A starting point of the preset parking distance is configured as the placement position of the warning sign.

The evasive vehicle may be any vehicle behind the target vehicle, and there is a driver on the evasive vehicle. The minimum braking distance of the evasive vehicle, the emergency response distance of the driver on the evasive vehicle and the line-of-sight range of the driver obtained in the embodiment may be universal data determined comprehensively by ignoring differences between different evasive vehicles.

Figure 3:
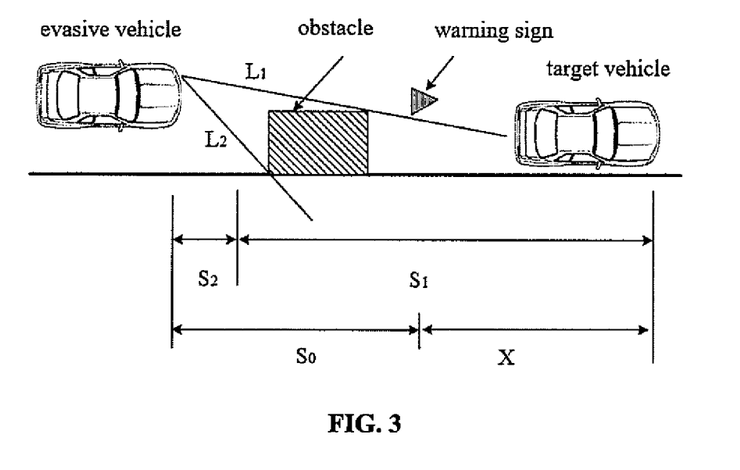
FIG. 3 is a schematic diagram of a process for determining a preset parking distance of a target vehicle according to an embodiment of the present disclosure.

As an example, FIG. 3 is a schematic diagram of a process for determining a preset parking distance of a target vehicle according to an embodiment of the present disclosure. The determination of the preset parking distance of the target vehicle is equivalent to the determination of the longitudinal placement position of the warning sign. As shown in FIG. 3, $S_1 = V_{max}^2/(2a_{max})$ represents the minimum braking distance of the evasive vehicle, where $V_{max}$ represents the maximum driving speed of the evasive vehicle on the current road, and the maximum driving speed is related to regulations of the maximum driving speed for different roads, and $a_{max}$ represents a maximum acceleration of the evasive vehicle, which is related to vehicle performance; $S_2 = V_{max} t$ represents the emergency response distance of the driver on the evasive vehicle, where t represents the emergency response time of the driver; $S_1 + S_2$ represents the shortest distance that the evasive vehicle may be controlled to move after the driver on the evasive vehicle sees the warning sign; $S_0$ represents the line-of-sight range of the driver on the evasive vehicle, and a specific value is related to current weather condition; and X represents the preset parking distance that the target vehicle continues to move after placing the warning sign, and the preset parking distance may be determined based on a moving distance of the head, tail, or center position of the vehicle body. When the target vehicle fails, in order to reduce the probability of vehicle collisions, the distance X that the target vehicle continues to move after placing the warning sign should satisfy the following formula:

$$V_{max} \cdot t + \frac{V_{max}^2}{2a_{max}} < S_0 + X$$

It may be seen from the above formula that the preset parking distance X of the target vehicle should be greater than a difference between a sum of the minimum braking distance of the evasive vehicle and the emergency response distance of the driver on the evasive vehicle and the line-of-sight range of the driver. To avoid vehicle collision accidents, the greater the preset parking distance X of the target vehicle, the higher a road safety factor. In addition, under the weather condition that does not affect the normal line-of-sight of people. A normal line-of-sight range of human eyes may be assigned to $S_0$. If there is the weather condition that affects the normal line-of-sight of human eyes, such as rain, snow, fog, etc., values of $S_0$, $S_1$ and $S_2$ need to be adjusted. In detail, different weights may be set for each value according to different weather conditions. For example, the minimum braking distance of the target vehicle in rainy or snowy weather should be increased, and the line-of-sight range of human eyes should be reduced in foggy weather, so that adjusted values of $S_0$, $S_1$ and $S_2$ are more suitable to actual weather conditions. Consequently, the value of the preset parking distance X determined in this manner is more valuable for improving road safety.

At block S207, the target vehicle is controlled to continue to move the preset parking distance before the target vehicle stops.

Alternatively, when the fault type supports the target vehicle in continuing to move, controlling the target vehicle to continue to move the preset parking distance before the target vehicle stops includes: when the fault type supports the target vehicle in continuing to move, switching the target vehicle from a normal driving mode to an abnormal state processing mode, the abnormal state processing mode being a backup driving control mode enabled after the target vehicle fails; and controlling the target vehicle to continue to move the preset parking distance based on a planned path in the abnormal state processing mode before the target vehicle stops.

After the target vehicle is switched to the abnormal state processing mode, a temporary parking position of the target vehicle may be determined based on surrounding environment information sensed by sensors deployed on the target vehicle. After determining the temporary parking position, a current planned path is determined based on a path planning algorithm and the vehicle is controlled to move to and park at the temporary parking position. Through the switching of the driving mode of the target vehicle and a path planning of an emergency stop, the target vehicle may continue to drive a set distance after a fault occurs. Therefore, it may be ensured that the warning sign is placed at a position having a certain distance from the target vehicle, thereby reducing a risk of collision between other vehicles and the target vehicle.

Alternatively, the method further includes: when the fault type does not support the target vehicle in continuing to move, sending a vehicle emergency signal while the target vehicle places the warning sign, so as to obtain rescue. The method of sending the vehicle emergency signal includes: automatically searching for a vehicle rescue station near the parking position and sending a rescue signal to the vehicle rescue station; or adding current fault information and parking position to the vehicle rescue signal and sending the vehicle rescue signal to a cloud rescue center to seek help. In addition, when the target vehicle fails, regardless of whether the target vehicle is supported in continuing to move, the target vehicle may be controlled to turn on a safety warning light, and the current fault information is sent to the cloud for remote fault analysis and rescue.

According to the technical solution of the embodiment of the present disclosure, when the target vehicle fails, on one hand, the target vehicle is controlled to place the warning sign at a reasonable preset position, and on the other hand, it is determined whether the target vehicle is supported in continuing to move, and determine the preset parking distance of the target vehicle based on the minimum braking distance of the evasive vehicle behind the target vehicle, the emergency response distance of the driver on the evasive vehicle, and the line-of-sight range of the driver, such that an effect of reasonably setting a safety distance between a faulty vehicle and the warning sign based on specific road conditions and weather conditions is achieved. The reasonableness of the setting of the safety distance ensures road safety and lowers a probability of collision accidents on the road.

Figure 4:
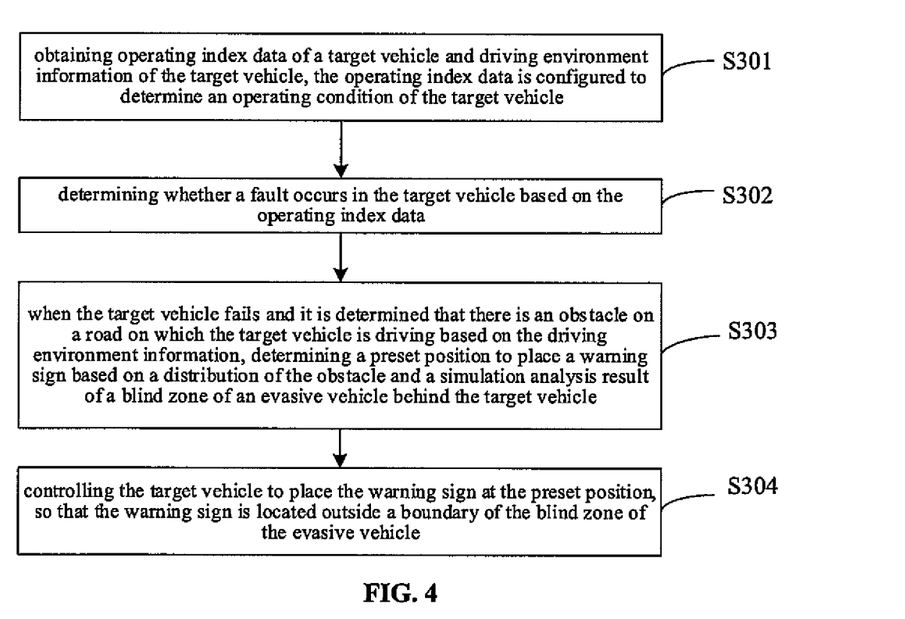
FIG. 4 is a flow chart of a vehicle fault processing method according to yet another embodiment of the present disclosure.

FIG. 4 is a flow chart of a vehicle fault processing method according to yet another embodiment of the present disclosure, which is optimized and expanded based on the foregoing embodiments, and may be combined with various optional technical solutions in the foregoing embodiments. As shown in FIG. 4, the method may include the following.

At block S301, operating index data of a target vehicle and driving environment information of the target vehicle are obtained. The operating index data is configured to determine an operating condition of the target vehicle.

At block S302, it is determined whether a fault occurs in the target vehicle based on the operating index data.

At block S303, when the target vehicle fails and it is determined that there is an obstacle on a road on which the target vehicle is driving based on the driving environment information, a preset position to place a warning sign is determined based on a distribution of the obstacle and a simulation analysis result of a blind zone of the evasive vehicle behind the target vehicle.

Figure 5:
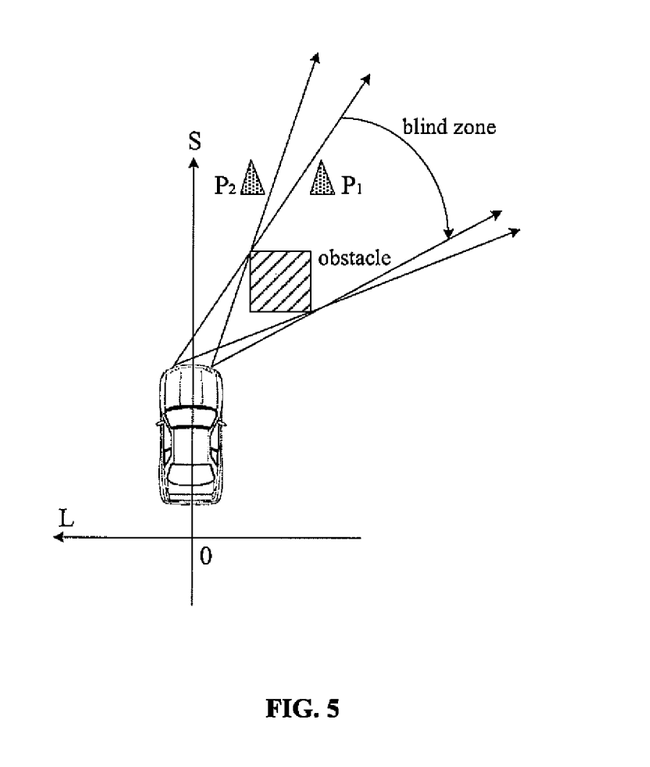
FIG. 5 is a schematic diagram of a blind zone analysis of an evasive vehicle according to an embodiment of the present disclosure.

Exemplarily, FIG. 5 is a schematic diagram of a blind zone analysis of an evasive vehicle behind the target vehicle. As shown in FIG. 5, there is an obstacle on the road currently. The evasive vehicle drives along the direction S. The direction L indicates a width direction of the road. According to the rectilinear propagation principle of light, the blind zone of the evasive vehicle in view of blocking by the obstacle may be determined as illustrated in the figure. If the warning sign is located in the blind zone of the evasive vehicle, for example, the warning sign is located at P1, the evasive vehicle cannot notice the warning sign in time during driving. Therefore, to ensure road safety, the warning sign should be placed within the line-of-sight range of human eyes and outside the blind zone of the evasive vehicle. For example, the warning sign is placed at P2.

During driving, the target vehicle may use the driving environment information obtained by a vehicle sensing module to determine that there is an obstacle on the road on which the target vehicle is currently driving and the type of obstacle. The obstacle may be a road obstacle that appears temporarily, or a road obstacle, a roadside tree, a mountain, etc., that has existed for a long time. And then according to the distribution of the obstacle behind the target vehicle, the line-of-sight range of human eyes, and a distance between the evasive vehicle behind the target vehicle and the target vehicle, etc., a blind zone analysis model of a vehicle is constructed, which analyzes the blind zone of the evasive vehicle behind the target vehicle based on the rectilinear propagation principle of light. Based on an analysis result of the blind zone and the distribution of the obstacle, a reasonable placement position of the warning sign is determined, so that the placement position of the warning sign is away from the obstacle. Determining the placement position of the warning sign by analyzing the blind zone of the evasive vehicle may adapt to changing characteristics of road scenes, and achieve an effect of flexibly determining the placement position according to different road scenes.

Further, determining the preset position to place the warning sign based on the distribution of the obstacle and the simulation analysis result of the blind zone of the evasive vehicle behind the target vehicle includes: adjusting a lateral position and/or a longitudinal position of the warning sign based on the distribution of the obstacle and the simulation analysis result of the blind zone of the evasive vehicle behind the target vehicle to determine the preset position to place the warning sign. That is, after a boundary of the blind zone of the evasive vehicle is determined, the position of the warning sign may be adjusted in a direction opposite to a driving direction of the vehicle, or the position of the warning sign may be adjusted in a direction perpendicular to the driving direction of the vehicle, or the position of the warning sign is adjusted in the aforementioned two directions at the same time, so that the warning sign is located outside the boundary of the blind zone of the evasive vehicle and may be found by the driver on the evasive vehicle in time.

At block 304, the target vehicle is controlled to place the warning sign at the preset position, so that the warning sign is located outside the boundary of the blind zone of the evasive vehicle.

Exemplarily, as shown in FIG. 3, based on the analysis on the blind zone of the evasive vehicle, the placement position of the warning sign is adjusted, and as shown in the figure, a final placement position of the warning sign is outside the boundary of the blind zone of the evasive vehicle, so that within the line-of-sight range of the driver on the evasive vehicle, the warning sign on the road may be found by the driver in time to avoid the target vehicle, thus preventing an collision from happening.

Alternatively, when the target vehicle fails, controlling the target vehicle to place the warning sign at the preset position based on the driving environment information includes: when it is determined that there is an obstacle on a road on which the target vehicle is driving based on the driving environment information, controlling, based on a distribution of the obstacle, the target vehicle to place the warning sign at the preset position corresponding to the distribution of the obstacle. The preset position corresponding to the distribution of the obstacle is a safe position to place the warning sign determined in advance by performing road simulation on the distribution of the obstacle. For example, a road scene is established based on a distribution of an obstacle on a specific road, and then a driving simulation is performed on front and rear vehicles. The front vehicle adjusts the placement position of the warning sign according to a visual effect of the rear vehicle on the warning sign, thereby determining the safe position of the warning sign in the current road scene. The safe position of the warning sign does not specifically refer to a fixed position, but may refer to a determined position area.

Predetermining the placement position of the warning sign based on the road scene simulation to enable the placement position of the warning sign to be away from the obstacle, may save resource consumption of decision-making computing on determining the placement position of the warning sign when the vehicle fails, thereby improving the efficiency of placing the warning sign.

According to the technical solution of the embodiment of the present disclosure, when there is an obstacle on the road, a reasonable placement position of the warning sign is determined based on an analysis result of the blind zone obtained by performing a blind zone analysis on the evasive vehicle behind the target vehicle and the distribution of the obstacle, or the warning sign is placed at the preset safe position based on a result of a road scene simulation performed in advance, so that a phenomenon in which the placement of the warning sign is unreasonable due to an existence of the blind zone of the vehicle behind the target vehicle is reduced. Consequently, in the line-of-sight range of human eyes, the driver on the evasive vehicle may find the warning sign in time and avoid the target vehicle timely, thus preventing collision accidents from happening.

Figure 6:
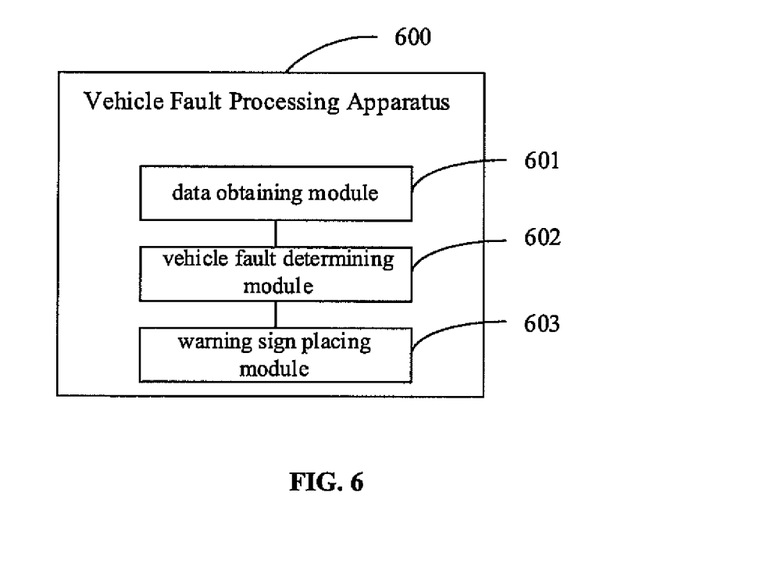
FIG. 6 is a block diagram of a vehicle fault processing apparatus according to an embodiment of the present disclosure.

FIG. 6 is a schematic structural diagram of a vehicle fault processing apparatus according to an embodiment of the present disclosure. The embodiment may be applicable to automatically placing a warning sign, for example, any type of warning sign, when a driving fault occurs in an autonomous vehicle, to achieve a purpose of prompting other driving vehicles to avoid the autonomous vehicle. The vehicle fault processing apparatus may be implemented in a software and/or hardware manner, and may be integrated in a vehicle control system or a vehicle-mounted device.

As shown in FIG. 6, the vehicle fault processing apparatus 600 disclosed by an embodiment may include a data obtaining module 601, a vehicle fault determining module 602 and a warning sign placing module 603.

The data obtaining module 601 is configured to obtain operating index data of a target vehicle and driving environment information of the target vehicle. The operating index data is configured to determine an operating condition of the target vehicle.

The vehicle fault determining module 602 is configured to determine whether a fault occurs in the target vehicle based on the operating index data.

The warning sign placing module 603 is configured to, when a fault occurs in the target vehicle, control the target vehicle to place the warning sign at a preset position based on the driving environment information.

Alternatively, the apparatus further includes a fault type determining module and a driving control module.

The fault type determining module is configured to, before the warning sign placing module 603 performs the operation of controlling the target vehicle to place the warning sign at the preset position based on the driving environment information, determine a fault type of the target vehicle based on fault information of the target vehicle.

The driving control module is configured to, when the fault type supports the target vehicle in continuing to move, control the target vehicle to continue to move a preset parking distance before the target vehicle stops. A starting point of the preset parking distance is configured as a placement position of the warning sign.

Alternatively, the apparatus further includes an avoidance distance obtaining module 601 and a preset parking distance determining module.

The avoidance distance obtaining module 601 is configured to, before the driving control module performs the operation of controlling the target vehicle to continue to move the preset parking distance before the target vehicle stops, obtain a minimum braking distance of the evasive vehicle behind the target vehicle, an emergency response distance of a driver on the evasive vehicle, and a line-of-sight range of the driver.

The preset parking distance determining module is configured to determine the preset parking distance based on the minimum braking distance, the emergency response distance and the line-of-sight range.

Alternatively, the warning sign placing module 603 includes: a road type determining unit and a warning sign placing unit.

The road type determining unit is configured to determine a type of road on which the target vehicle is driving based on the driving environment information.

The warning sign placing unit is configured to control, based on the type of road, the target vehicle to place the warning sign at the preset position corresponding to the type of road.

Alternatively, the warning sign placing module 603 includes: a curve entrance determining unit and a first curve warning sign placing unit.

The curve entrance determining unit is configured to determine, based on a vehicle position in the driving environment information, whether a curve entrance exists on a vehicle driving path on which the target vehicle drives a first preset distance based on the vehicle position.

The first curve warning sign placing unit is configured to, when the curve entrance exists, control the target vehicle to place the warning sign at a position having a second preset distance from the curve entrance before the target vehicle enters the curve entrance.

Alternatively, the first curve warning sign placing unit includes: a curve entrance position obtaining subunit, a distance calculating subunit, and a curve warning sign placing subunit.

The curve entrance position obtaining subunit is configured to obtain a position of the curve entrance from a navigation map.

The distance calculating subunit is configured to calculate a distance between a parallel line where a tail of the target vehicle is located and the position of the curve entrance in real time during driving of the target vehicle. The parallel line where the tail of the target vehicle is located is perpendicular to a driving direction of the target vehicle.

The curve warning sign placing subunit is configured to, when the distance calculated in real time reaches the second preset distance, control the target vehicle to place the warning sign on the parallel line where the tail of the target vehicle is located based on a current position of the target vehicle.

Alternatively, the warning sign placing module 603 includes: a preset position determining unit and a second curve warning sign placing unit.

The preset position determination unit is configured to, when it is determined that there is an obstacle on a road on which the target vehicle is driving based on the driving environment information, determine the preset position to place the warning sign based on a distribution of the obstacle and a simulation analysis result of a blind zone of the evasive vehicle behind the target vehicle.

The second curve warning sign placement unit is configured to control the target vehicle to place the warning sign at the preset position, so that the warning sign is located outside a boundary of the blind zone of the evasive vehicle.

Alternatively, the preset position determining unit is specifically configured to: adjust a lateral position and/or a longitudinal position of the warning sign based on the distribution of the obstacle and the simulation analysis result of the blind zone of the evasive vehicle behind the target vehicle to determine the preset position to place the warning sign.

Alternatively, the warning sign placing module 603 includes: a third curve warning sign placing unit.

The third curve warning sign placing unit is configured to, when it is determined that there is an obstacle on a road on which the target vehicle is driving based on the driving environment information, control, based on the distribution of the obstacle, the target vehicle to place the warning sign at the preset position corresponding to the distribution of the obstacle. The preset position corresponding to the distribution of the obstacle is a safe position to place the warning sign determined in advance by performing road simulation on the distribution of the obstacle.

Alternatively, the driving control module includes: a mode switching unit and a driving control unit.

The mode switching unit is configured to, when the fault type supports the target vehicle in continuing to move, switch the target vehicle from a normal driving mode to an abnormal state processing mode.

The driving control unit is configured to control the target vehicle to continue to move the preset parking distance based on a planned path in the abnormal state processing mode before the target vehicle stops.

Alternatively, the apparatus further includes a vehicle emergency signal sending module, configured to, when the fault type does not support the target vehicle in continuing to move, send a vehicle emergency signal while the target vehicle places the warning sign, so as to obtain rescue.

The vehicle fault processing apparatus 600 disclosed in the embodiment of the present disclosure may execute any vehicle fault processing method disclosed in any embodiment of the present disclosure, and has corresponding function modules for executing the method and corresponding beneficial effects. For content that is not described in detail in this embodiment, reference may be made to the description of any method embodiment in the present disclosure.

According to an embodiment of the present disclosure, the present disclosure further provides an electronic device and a readable storage medium.

Figure 7:
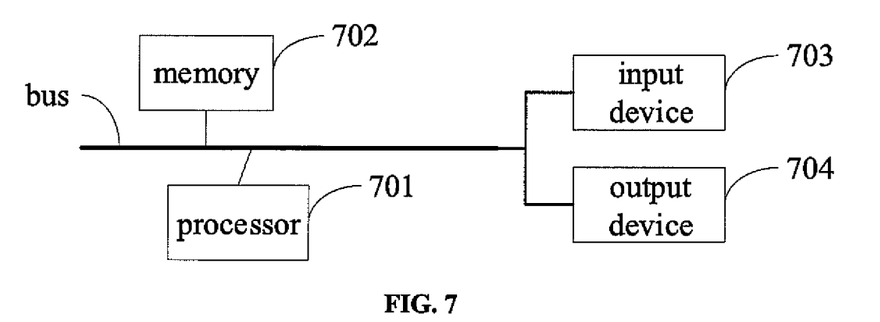
FIG. 7 is a block diagram of an electronic device according to an embodiment of the present disclosure.

FIG. 7 is a block diagram of an electronic device for implementing a vehicle fault processing method according to an embodiment of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As shown in FIG. 7, the electronic device includes: one or more processors 701, a memory 702, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 701 is taken as an example in FIG. 7.

The memory 702 is a non-transitory computer-readable storage medium according to the embodiments of the present disclosure. The memory stores instructions executable by at least one processor, so that the at least one processor executes the vehicle fault processing method according to the embodiments of the present disclosure. The non-transitory computer-readable storage medium according to the present disclosure stores computer instructions, which are configured to make the computer execute the vehicle fault processing method according to the embodiments of the present disclosure.

As a non-transitory computer-readable storage medium, the memory 702 may be configured to store non-transitory software programs, non-transitory computer executable programs and modules, such as program instructions/modules (for example, the data obtaining module 601, the vehicle fault determining module 602 and the warning sign placing module 603 shown in FIG. 6) corresponding to the vehicle fault processing method according to the embodiment of the present disclosure. The processor 701 executes various functional applications and performs data processing of the server by running non-transitory software programs, instructions and modules stored in the memory 702, that is, the vehicle fault processing method according to the foregoing method embodiments is implemented.

The memory 702 may include a storage program area and a storage data area, where the storage program area may store an operating system and applications required for at least one function; and the storage data area may store data created according to the use of the electronic device that implements the vehicle fault processing method according to the embodiments of the present disclosure, and the like. In addition, the memory 702 may include a high-speed random access memory, and may further include a non-transitory memory, such as at least one magnetic disk memory, a flash memory device, or other non-transitory solid-state memories. In some embodiments, the memory 702 may optionally include memories remotely disposed, with respect to the processor 701, and these remote memories may be connected to the electronic device, which is configured to implement the vehicle fault processing method according to the embodiments of the present disclosure, through a network. Examples of the network include, but are not limited to, the Internet, an intranet, a local area network, a mobile communication network, and combinations thereof.

The electronic device configured to implement the vehicle fault processing method according to the embodiments of the present disclosure may further include an input device 703 and an output device 704. The processor 701, the memory 702, the input device 703 and the output device 704 may be connected through a bus or in other manners. FIG. 7 is illustrated by establishing the connection through a bus.

The input device 703 may receive input numeric or character information, and generate key signal inputs related to user settings and function control of the electronic device configured to implement the vehicle fault processing method according to the embodiments of the present disclosure, such as a touch screen, a keypad, a mouse, a trackpad, a touchpad, a pointing stick, one or more mouse buttons, trackballs, joysticks and other input devices. The output device 704 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, when the autonomous vehicle fails, the autonomous vehicle is controlled, based on the driving environment information, to automatically place the warning sign at a reasonable preset position that is adapt to the current driving environment information, so that an effect of autonomously executing an early fault warning by the autonomous vehicle without human intervention is achieved to prompt other vehicles on the road to pay attention to the autonomous vehicle, thereby avoiding vehicle collision accidents and improving road safety. In addition, by placing warning signs at preset positions corresponding to the types of roads according to different types of roads, an effect of placing warning signs differently according to actual situations of the roads is achieved, thereby lowering a probability of accidents on different types of roads. The preset parking distance of the target vehicle is determined based on the minimum braking distance of the evasive vehicle behind the target vehicle, the emergency response distance of the driver on the evasive vehicle, and the line-of-sight range of the driver, and thus an effect of reasonably setting a safety distance between a faulty vehicle and the warning sign based on specific road conditions and weather conditions is achieved. The reasonable placement position of the warning sign is determined in combination with the blind zone of the evasive vehicle behind the target vehicle and the distribution of the obstacle. In this manner, a phenomenon in which the placement of the warning sign is unreasonable due to an existence of the blind zone of the vehicle behind the target vehicle is reduced, so that in the line-of-sight range of human eyes, the driver on the evasive vehicle may find the warning sign in time and avoid the target vehicle timely, preventing collision accidents from happening.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub combinations and substitutions may be made according to design requirements and other factors. Any modification, equivalent replacement and improvement made within the spirit and principle of the present disclosure shall be included in the protection scope of the present disclosure.

What is claimed is:

1. A vehicle fault processing method, comprising:
   obtaining operating index data of a target vehicle and driving environment information of the target vehicle, wherein the operating index data comprises an operating condition of the target vehicle;
   determining whether a fault occurs in the target vehicle based on the operating index data;
   determining a fault type of the target vehicle based on fault information of the target vehicle; and
   when the fault occurs in the target vehicle and the fault type supports the target vehicle in continuing to move, controlling the target vehicle to place a warning sign at a preset placement position based on the driving environment information;
   obtaining a minimum braking distance of an evasive vehicle behind the target vehicle, an emergency response distance of a driver of the evasive vehicle, and a line-of-sight range of the driver of the evasive vehicle;
   determining a preset parking distance based on the minimum braking distance, the emergency response distance and the line-of-sight range; and
   controlling the target vehicle to continue to move the preset parking distance before the target vehicle stops, wherein a starting point of the preset parking distance is configured as the preset placement position of the warning sign, and each of the minimum braking distance, the emergency response distance and the line-of-sight range has different weights for different weather conditions.

2. The method of claim 1, wherein controlling the target vehicle to place the warning sign at the preset placement position based on the driving environment information comprises:
   determining a type of road on which the target vehicle is driving based on the driving environment information; and
   controlling, based on the type of road, the target vehicle to place the warning sign at the preset placement position corresponding to the type of road.

3. The method of claim 1, wherein controlling the target vehicle to place the warning sign at the preset placement position based on the driving environment information comprises:
   determining, based on a vehicle position in the driving environment information, whether a curve entrance exists on a vehicle driving path on which the target vehicle drives a first preset distance based on the vehicle position; and
   when the curve entrance exists, controlling the target vehicle to place the warning sign at a position having a second preset distance from the curve entrance before the target vehicle enters the curve entrance.

4. The method of claim 3, wherein controlling the target vehicle to place the warning sign at the position having the second preset distance from the curve entrance comprises:
   obtaining a position of the curve entrance from a navigation map;
   calculating a distance between a line defined by a tail of the target vehicle and the position of the curve entrance in real time during driving of the target vehicle, wherein the line is perpendicular to a driving direction of the target vehicle; and
   when the distance calculated in real time reaches the second preset distance, controlling the target vehicle to place the warning sign on the based on a current position of the target vehicle.

5. The method of claim 1, wherein controlling the target vehicle to place the warning sign at the preset placement position based on the driving environment information comprises:
   when it is determined that an obstacle exists on a road on which the target vehicle is driving based on the driving environment information, determining the preset placement position to place the warning sign based on a distribution of the obstacle and a simulation analysis result of a blind zone of an evasive vehicle behind the target vehicle; and
   controlling the target vehicle to place the warning sign at the preset placement position, so that the warning sign is located outside a boundary of the blind zone of the evasive vehicle.

6. The method of claim 5, wherein determining the preset placement position to place the warning sign based on the distribution of the obstacle and the simulation analysis result of the blind zone of the evasive vehicle behind the target vehicle comprises:
   adjusting a lateral position and/or a longitudinal position of the warning sign based on the distribution of the obstacle and the simulation analysis result of the blind zone of the evasive vehicle behind the target vehicle to determine the preset placement position to place the warning sign.

7. The method of claim 1, wherein controlling the target vehicle to place the warning sign at the preset placement position based on the driving environment information comprises:

when it is determined that an obstacle exists on a road on which the target vehicle is driving based on the driving environment information, controlling, based on a distribution of the obstacle, the target vehicle to place the warning sign at the preset placement position corresponding to the distribution of the obstacle;

wherein the preset placement position corresponding to the distribution of the obstacle is a safe position to place the warning sign determined in advance by performing road simulation on the distribution of the obstacle.

8. The method of claim 1, wherein when the fault type supports the target vehicle in continuing to move, controlling the target vehicle to continue to move the preset parking distance before the target vehicle stops comprises:

when the fault type supports the target vehicle supports in continuing to move, switching the target vehicle from a normal driving mode to an abnormal state processing mode; and controlling the target vehicle to continue to move the preset parking distance based on a planned path in the abnormal state processing mode before the target vehicle stops.

9. The method of claim 1, further comprising:

when the fault type does not support the target vehicle in continuing to move, sending a vehicle emergency signal while the target vehicle places the warning sign, so as to obtain rescue.

10. An electronic device, comprising:

at least one processor; and a memory communicably connected to the at least one processor; wherein, the memory stores an instruction executable by the at least one processor, and when the instruction is executed by the at least one processor, the at least one processor is caused to execute a vehicle fault processing method, comprising:

obtaining operating index data of a target vehicle and driving environment information of the target vehicle, wherein the operating index data comprises an operating condition of the target vehicle;

determining whether a fault occurs in the target vehicle based on the operating index data;

determining a fault type of the target vehicle based on fault information of the target vehicle; and when the fault occurs in the target vehicle and the fault type supports the target vehicle in continuing to move, controlling the target vehicle to place a warning sign at a preset placement position based on the driving environment information;

obtaining a minimum braking distance of an evasive vehicle behind the target vehicle, an emergency response distance of a driver of the evasive vehicle, and a line-of-sight range of the driver of the evasive vehicle;

determining a preset parking distance based on the minimum braking distance, the emergency response distance and the line-of-sight range; and controlling the target vehicle to continue to move the preset parking distance before the target vehicle stops, wherein a starting point of the preset parking distance is configured as the preset placement position of the warning sign, and each of the minimum braking distance, the emergency response distance and the line-of-sight range has different weights for different weather conditions.

11. The electronic device of claim 10, wherein controlling the target vehicle to place the warning sign at the preset placement position based on the driving environment information comprises:

determining a type of road on which the target vehicle is driving based on the driving environment information; and controlling, based on the type of road, the target vehicle to place the warning sign at the preset placement position corresponding to the type of road.

12. The electronic device of claim 10, wherein controlling the target vehicle to place the warning sign at the preset placement position based on the driving environment information comprises:

determining, based on a vehicle position in the driving environment information, whether a curve entrance exists on a vehicle driving path on which the target vehicle drives a first preset distance based on the vehicle position; and when the curve entrance exists, controlling the target vehicle to place the warning sign at a position having a second preset distance from the curve entrance before the target vehicle enters the curve entrance.

13. The electronic device of claim 10, wherein controlling the target vehicle to place the warning sign at the preset placement position based on the driving environment information comprises:

when it is determined that an obstacle exists on a road on which the target vehicle is driving based on the driving environment information, determining the preset placement position to place the warning sign based on a distribution of the obstacle and a simulation analysis result of a blind zone of an evasive vehicle behind the target vehicle; and controlling the target vehicle to place the warning sign at the preset placement position, so that the warning sign is located outside a boundary of the blind zone of the evasive vehicle.

14. The electronic device of claim 10, wherein controlling the target vehicle to place the warning sign at the preset placement position based on the driving environment information comprises:

when it is determined that an obstacle exists on a road on which the target vehicle is driving based on the driving environment information, controlling, based on a distribution of the obstacle, the target vehicle to place the warning sign at the preset placement position corresponding to the distribution of the obstacle;

wherein the preset placement position corresponding to the distribution of the obstacle is a safe position to place the warning sign determined in advance by performing road simulation on the distribution of the obstacle.

15. The electronic device of claim 10, wherein when the fault type supports the target vehicle in continuing to move, controlling the target vehicle to continue to move the preset parking distance before the target vehicle stops comprises:

when the fault type supports the target vehicle supports in continuing to move, switching the target vehicle from a normal driving mode to an abnormal state processing mode; and controlling the target vehicle to continue to move the preset parking distance based on a planned path in the abnormal state processing mode before the target vehicle stops.

16. A non-transitory computer-readable storage medium having a computer instruction stored thereon, wherein the computer instruction is configured to enable a computer to execute a vehicle fault processing method, comprising:

obtaining operating index data of a target vehicle and driving environment information of the target vehicle, wherein the operating index data comprises an operating condition of the target vehicle;

determining whether a fault occurs in the target vehicle based on the operating index data; determining a fault type of the target vehicle based on fault information of the target vehicle; and when the fault occurs in the target vehicle and the fault type supports the target vehicle in continuing to move, controlling the target vehicle to place a warning sign at a preset placement position based on the driving environment information;

obtaining a minimum braking distance of an evasive vehicle behind the target vehicle, an emergency response distance of a driver of the evasive vehicle, and a line-of-sight range of the driver of the evasive vehicle;

determining a preset parking distance based on the minimum braking distance, the emergency response distance and the line-of-sight range; and controlling the target vehicle to continue to move the preset parking distance before the target vehicle stops, wherein a starting point of the preset parking distance is configured as the preset placement position of the warning sign, and each of the minimum braking distance, the emergency response distance and the line-of-sight range has different weights for different weather conditions.

\* \* \* \* \*